United States Patent

Thompson

[15] 3,639,702

[45] Feb. 1, 1972

[54] COMMUNICATION SYSTEM TRAFFIC SURVEY ARRANGEMENT

[72] Inventor: Harold K. Thompson, San Anselmo, Calif.

[73] Assignee: American Telephone and Telegraph Company, New York, N.Y.

[22] Filed: Aug. 19, 1970

[21] Appl. No.: 65,164

[52] U.S. Cl. ........................................179/175.2 C, 179/8 A

[51] Int. Cl. ........................................H04m 3/22, H04m 3/36

[58] Field of Search ....................................179/175.2 C, 8 A

*Primary Examiner*—Kathleen H. Claffy

*Assistant Examiner*—Douglas W. Olms

*Attorney*—N. S. Ewing and William L. Keefauver

[57] ABSTRACT

In order to obtain a count of the number of ineffectual attempts which are made to seize a trunk in a direct progression communication system trunk subgroup in which all the trunks are busy, current detectors are inserted into the path between the hunting switch stepping relay of each selector level to be studied and the sleeve leads of the ninth (next to last) and tenth (last) trunks. The current detectors are arranged such that in normal operation when the associated trunk is activated the detector remains off. However, when the selector switch steps past a busy trunk the current from the stepping relay enables the detector. Circuitry is provided to insure that a count will be recorded only during the hunting interval of the selector switch and not during the release interval.

20 Claims, 8 Drawing Figures

INVENTOR
H. K. THOMPSON
BY David H. Tannenbaum
ATTORNEY

COMMUNICATION SYSTEM TRAFFIC SURVEY ARRANGEMENT

BACKGROUND OF THE INVENTION

This invention relates generally to communication system traffic survey circuits and, more particularly, to an arrangement for detecting the number of ineffectual attempts which are made to seize a trunk circuit in a particular group of such trunks.

DESCRIPTION OF THE PRIOR ART

It is well known that in communication switching systems a separate transmission path does not exist between each and every telephone station. Instead, stations are arranged into groups and the groups are interconnected by trunk circuits accessible to all of the stations in each group. In the usual situation, a number of such trunk circuits associated with a particular destination are available to a number of stations, the number of stations being considerably in excess of the number of trunks. The precise number of trunks that are necessary between a group of stations and a certain destination is statistically determined from traffic surveys. It follows therefore that the accuracy of the collected statistical data is a critical factor in the determination of the quality, the accessibility and the economics of any communication switching system.

One arrangement for obtaining statistical data corresponding to the usage of the trunks in a particular trunk group is to count the number of times an attempt is made to complete a connection over one of the trunks which attempt fails because all of the trunks in the group are busy. In common control systems, such as crossbar systems, such a "peg count" is obtained in a straightforward manner by monitoring the "all trunks busy" relay in the marker.

However, in direct progression selector switching systems, such as step-by-step systems, the problem becomes more difficult since a central record cannot be maintained because each selector hunts individually over a subgroup of trunks searching for a trunk that is idle. In such a system, when a trunk is busy a ground is connected via the trunk sleeve lead to the position in each selector associated with that trunk. The ground on the selector terminals causes any stepping magnet of a "hunting" selector to advance to the next terminal. Thus, ground potential on all 10 trunk positions of a selector switch level causes a hunting selector to step to the eleventh position. In the 11th position, the selector reverses direction and returns to the start position. Thus, in direct progression systems in order to obtain a peg count of the number of ineffectual attempts to connect to a group of trunks it is necessary to determine how often the associated selectors advance to their respective eleventh rotary positions.

One obvious answer to this problem is to monitor the 11th position of each selector and count the number of times each selector advances to that position. Such an approach becomes prohibitively expensive since each trunk is multiplied to a number of selectors all of which would have to be physically modified to provide the indication desired. Other arrangements for physically detecting the arrangement of a selector to the eleventh position, such as light detectors, also must be disregarded because of the excessive cost.

In the past, circuit arrangements such as T. L. Dimond, U. S. Pat. 2,378,541, dated June 19, 1945, have been devised to determine the busy-idle status of a trunk circuit. In Dimond, provision is made to use the winding of a test relay connected into a trunk sleeve lead to determine whether that trunk is currently busy. Since the trunk sleeve leads in a direct progressive switching system are extremely sensitive, the introduction therein of a relay winding is impractical. In addition, since in Dimond the only output is a busy-idle indication of each trunk, no provision is available to provide a count of the number of ineffectual attempts which are made to seize the busy trunks.

The prior art systems which do provide such a count, such as H. Hovland, U.S. Pat. 2,216,532, dated Oct. 1, 1940, use pen registers to record attempts to seize trunks. As taught by Hovland, the registers provide trunk identification as well as indications as to whether the trunk was busy when called. The pen registers of the Hovland system are driven from pulse information supplied by the step-by-step system and the marks produced by the pens are then interpreted visually by operators.

In addition to being mechanically awkward the Hovland register is extremely uneconomical to use since trained personnel must be employed to read and interpret the data provided by pen registers. As a further limitation, the Hovland arrangement provides only a subjectively obtained static history of events. Thus, in situations where a direct electronic output is necessary, such as when the obtained statistical data is immediately unable to reconfigure the switching network, the Hovland system and similar prior art traffic survey systems are inadequate.

Accordingly, a need exists in the art for an economical and easily implemented arrangement for monitoring a particular selector stage in a progression-type switching system and for obtaining statistically reliable data pertaining to the number of times an ineffectual attempt is made to establish a connection to one of the circuits associated with that stage.

In addition, a need exists in the art for a traffic survey system capable of isolating a particular switching stage from a lower switching stage so as to obtain a peg count in the isolated stage without interference from switches in other stages.

SUMMARY OF THE INVENTION

These and other objects are obtained in accordance with one exemplary embodiment of the invention wherein the selectors of a step-by-step communication system are arranged such that the ninth (next to last) circuit or trunk position and 10th (last) circuit or trunk position of each selector to be studied are monitored. This monitoring is accomplished by inserting low-valued resistors into the paths between the hunting switch stepping relays and the sleeve grounds of the ninth and 10th position trunks. Associated with each resistor is a transistor arranged such that in normal operation when the trunk is activated the current through the resistor is too small to turn the transistor on. However, when the selector switch stepping relay contacts a terminal associated with a busy trunk the relatively heavy current from the stepping relay passes through the resistor and thus enables the transistor.

Since the switch always hunts from lower trunk positions upward, the transistor associated with the ninth position trunk operates before the transistor associated with the tenth position trunk. Accordingly, a logic circuit is provided which insures that a peg count will only be made when the ninth position transistor operates followed by the operation of the 10th position transistor. When the selector returns from the 11th position, after having searched all the trunk positions and causing the registration of one peg count, the 10th position transistor operates before the ninth position transistor and the logic circuit is arranged to inhibit a peg count from being recorded under these conditions.

In situations when more than one switching stage is involved, isolation circuits are inserted between the stages in such a manner as to prevent the registration of a peg count based upon the rotations of switches in a switching stage other than the stage in which the study is being conducted.

Accordingly, it is a feature of the present invention to provide a circuit configuration for use in a direct progression selector switching system where statistical data pertaining to circuit overload conditions is obtained by monitoring the consecutive positions through which a selector switch travels.

It is another feature of the present invention to provide statistical data pertaining to any switching stage of a selector switching system without interference from other switching stages by the insertion of isolation circuits between the stages.

It will be noted that FIGS. 3 through 6 employ a type of notation referred to as "detached contact" in which an X shown intersecting a conductor represents a normally open contact of a relay and a bar shown intersecting a conductor at right angles represents a normally closed contact of a relay; "-normally" referring to the unoperated condition of the relay. The principles of this type of notation are described in an article entitled "An Improved Detached Contact Type Schematic Circuit Drawing" by F. T. Meyer in the Sept. 1955 publication, Part 1, Transactions of The American Institute of the Electrical Engineers, Communications and Electronics, Vol. 74, pages 505–513.

Figure 3:
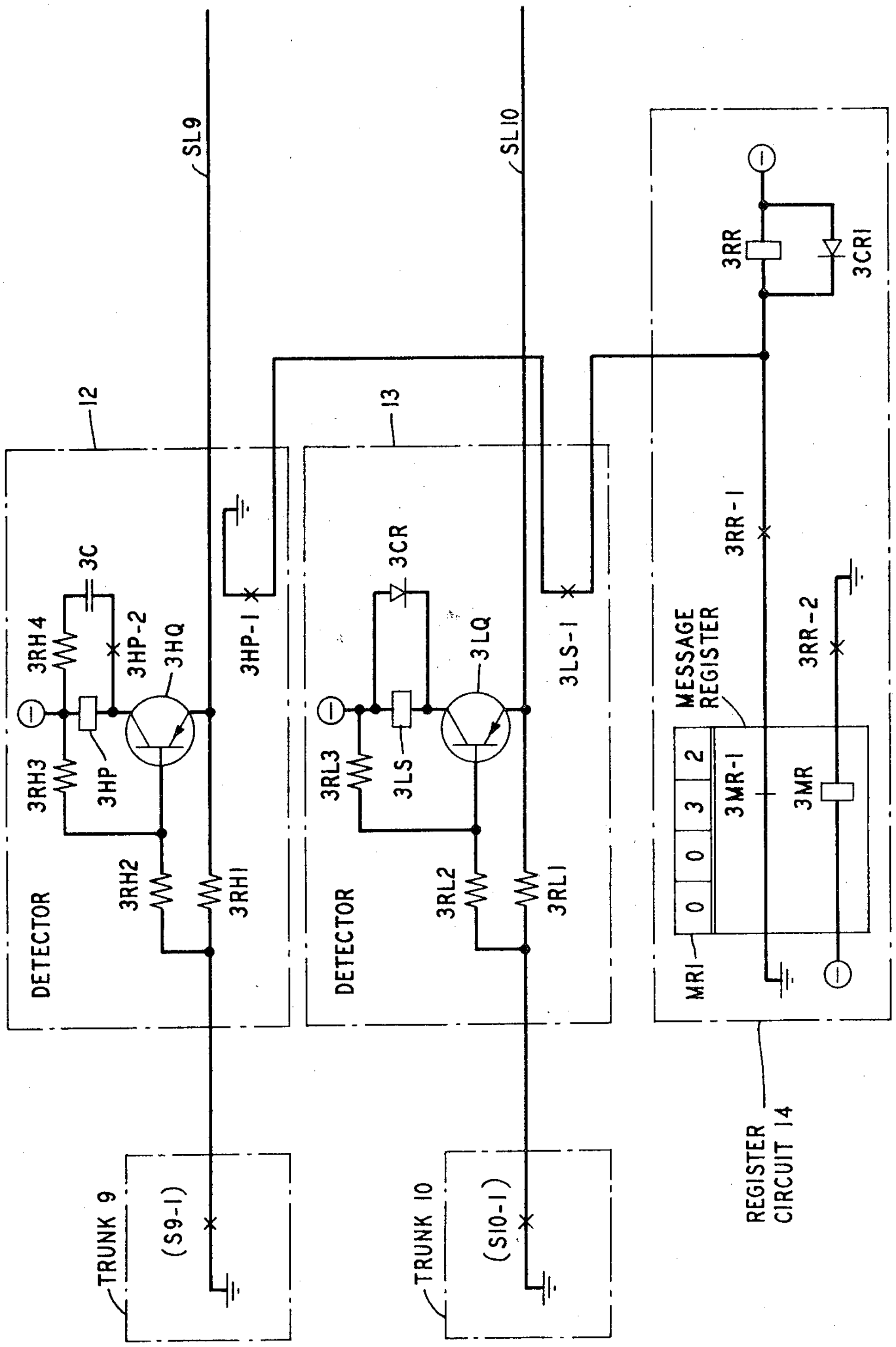
FIGS. 3 through 6 are schematic drawings showing in greater detail the interrelation of the components of the illustrative embodiments.

It will be noted also that in order to simplify the disclosure and thus facilitate a more complete understanding of the embodiment, the relays, relay contacts and other electromechanical devices shown in FIGS. 3 through 6 have been given systematic designations. Thus, the number preceding the letters of each device correspond to the figure in which the control circuit of the device is shown. Thus, the coil of relay 3HP is shown in FIG. 3. Each relay contact, either make, break or transfer, is shown with its specific contact number preceded by the designation of the relay to which it belongs. For example, the notation 3HP–1 indicates contact number 1 of relay 3HP the coil of which is shown in FIG. 3.

INTRODUCTION

Figure 1:
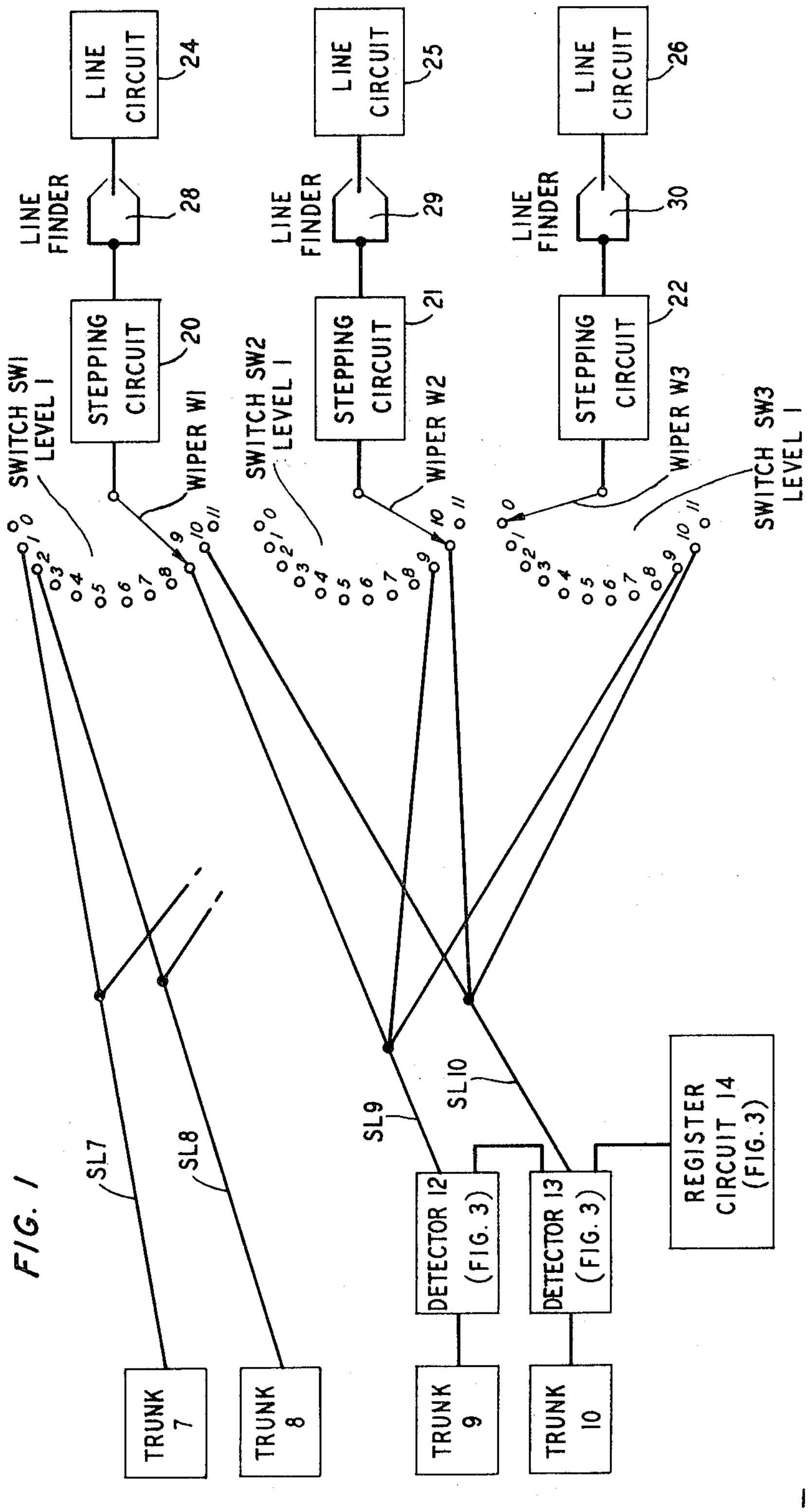
FIG. 1 is a block diagram of a direct progression type of selector system showing one switching stage.
Figure 8:
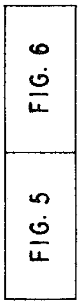
FIGS. 7 and 8 show the manner in which the other FIGS. should be arranged.
Figure 7:
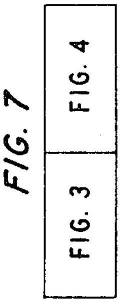

Prior to discussing the operation of applicant's invention, a partial review of direct progression switching operations will be undertaken. Referring now to FIG. 1, when line circuit 24 becomes active line finder 28 operates to detect the active state thereof and to connect the active circuit to the first stage switch, such as switch SW1, of the switching network. The dialing by the subscriber served by the line circuit 24 of the digit representative of the desired trunk results in the operation of switch SW1 to the level corresponding to the dialed digit. For example, if the dialed digit is "1" the first selector stage switch SW1 will move to the first level. Since the first selector stage in the illustrative embodiment is a trunk stage the selector switch SW1 will hunt over the terminals of that level for an idle trunk.

The leads, such as leads SL7–SL10, associated with each trunk having an appearance on the first level of switch SW1 are the sleeve leads of the respective trunks. When the associated trunk becomes busy, a ground is placed on the respective SL-lead by the activated trunk. It is to be understood that the actual transmission leads, such as the tip and ring leads, associated with each trunk are accessed through electrically separate but mechanically ganged wipers of each switch at the terminal position associated with the respective sleeve leads, as is well known in the art.

Figure 4:
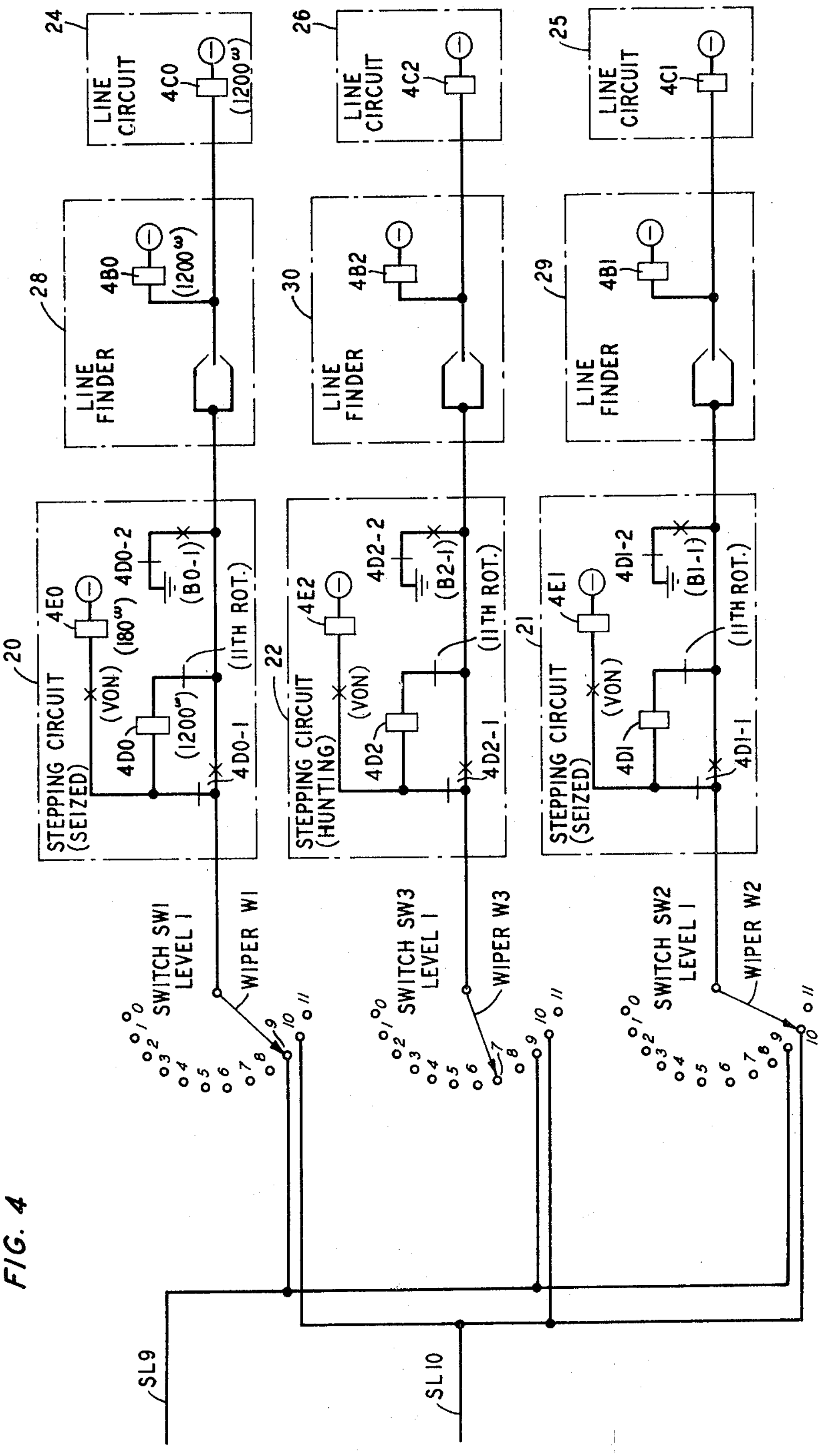

The stepping circuits, such as stepping circuit 20, each contains a relay, such as relay 4EO shown in FIG. 4, which relay operates to advance the selector one position when ground is present on the associated wiper, such as wiper W1 of switch SW1. Thus, when switch SW1 is in a hunting mode and trunk 7 is busy, the stepping relay of stepping circuit 20 will operate upon being connected to terminal 1 via wiper W1, thus advancing the selector to position two. A permanent ground is wired to any terminal to which a trunk is not currently associated and the switch thereby steps past such unused terminals. The selector thus continues to step under control of the stepping relay until a terminal is contacted upon which ground potential is not present.

When the wiper arrives at a terminal having an absence of ground thereon, the stepping relay does not operate. In addition, the absence of ground allows the operation of a connecting relay, such as relay 4DO, FIG. 4, which relay removes the stepping relay from the circuit and establishes a cutthrough condition so that communication, or further dialing, can take place between the station served by the controlling line circuit and the selected previously idle trunk in the trunk subgroup associated with the activated selector.

In situations where no trunks are available and thus all of the terminals on a switch level contain ground potential, the selector steps to the eleventh position and busy tone is returned through the controlling line circuit to the calling line. The selector is thereupon released and returns to the starting position. During this return interval the wiper of the activated selector again contacts each terminal momentarily. The significance of the second contact will be more fully appreciated from that which is contained hereinafter.

Figure 2:
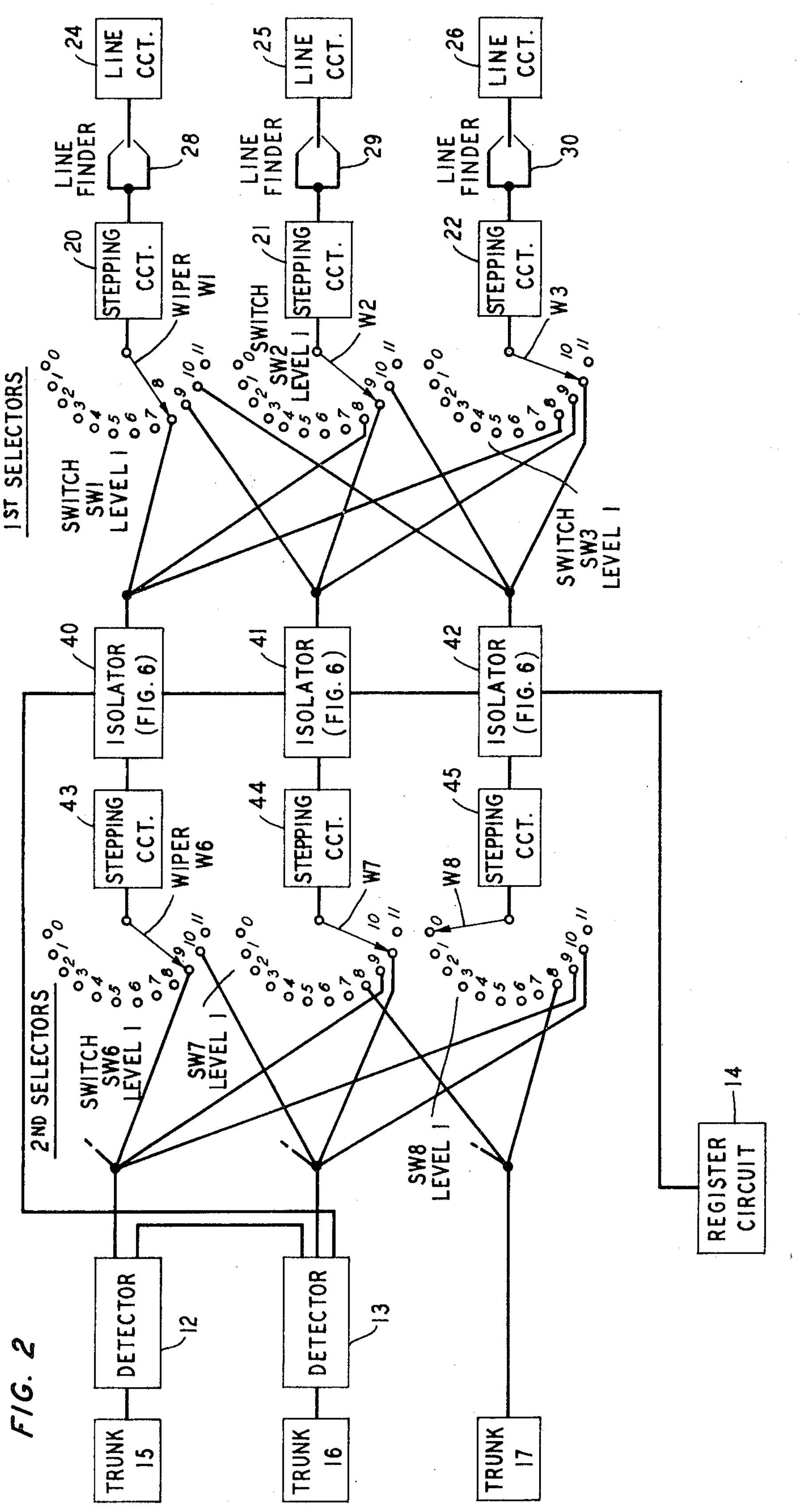
FIG. 2 is a block diagram of a direct progression type of selector system showing two switching stages.

Referring now to FIG. 2, the direct progression switching system described above is shown expanded in the well-known manner by the addition of second switching stage switches SW6, SW7, and SW8 interposed between the switches SW1–SW4 of the first stage and the trunk circuits 15, 16, and 17. In this two-stage system, the second stage selectors SW6–SW8 act in the same manner as the first-stage switches described above for a single-stage network to establish connections to idle trunks.

The first-stage selectors are used to expand the network by providing access to different trunk subgroups at each terminal. For example, if switch SW1 is directed by line circuit 24 to a connection associated with level 1, wiper W1 of switch SW1 will hunt over the terminals of level 1 for the lowest idle path to the trunk subgroups associated with a second-stage selector. Since as is well known in the art, all of the trunks are not repeated on all of the second stages, different trunk routing is available depending upon the busy-idle status of the second stage selectors. The precise manner in which the illustrated two-stage switching network functions will be detailed more fully hereinafter.

DETAILED DESCRIPTION 2.1 Connection to Next-to-Last Trunk (Ninth Position)

Turning now to FIGS. 3 and 4, let us assume that trunk 9 is idle and all trunks (not shown) connected to lower numbered terminals of switch SW1, level 1, are busy. Let us further assume that line circuit 24 is directed via line finder 28 to stepping circuit 20 associated with switch SW1, level 1, for connection to a trunk associated with that subgroup.

Accordingly, battery via relay coil 4CO in line circuit 24 is in parallel with battery via relay coil 4BO in line finder 28 and the parallel combination is present on one side of cutthrough control relay 4DO in stepping circuit 20 via a released contact of the 11th rotary position. Upon seizure of the stepping circuit, a relay (BO) (coil not shown) operates and maintains relays 4BO and 4CO operated, as is known in the art, over an obvious circuit including contacts (BO–1). Relays 4EO and 4DO remain normal at this point due to released off-normal contact (VON).

It should be noted at this point that the number in parentheses next to the relay coils indicates typical resistance values of the respective coils, thus the coil of relay 4DO is 1,200 ohms while the coil of relay 4EO is 180 ohms. It should also be noted that it has been assumed that 48 volts is the typical working voltage of the illustrated system. The importance of these values will be more fully appreciated from that which is to follow.

Prior to beginning the stepping sequence, wiper W1 of switch SW1, level 1, is on terminal "0." Since a ground is presently on that terminal either permanently wired or as a result of an operated S relay in an associated trunk, relay 4EO in stepping circuit 20 operates through the 180 ohm coil to battery. The current drawn from ground in the trunk at this time is approximately 400 ma. Relay 4DO remains normal at this point due to ground on both sides of its winding. The operation of stepping relay 4EO advances wiper W1 to terminal 1 in the well-known manner as discussed previously.

Ground potential is on all terminals lower than terminal 9 due to the assumed busy condition of all the associated trunks and wiper W1 continues advancing until contact is made with terminals 9 which terminal does not have ground thereon due to the assumed idle status of the S relay in the associated trunk 9, FIG. 3. Accordingly, relay 4EO in stepping circuit 20 does not operate. However, the shunting ground is also now removed and relay 4DO operates from ground via released break contact 4DO–2, enabled make contact (BO–1) and the released 11th rotary contact and through the coil of the 4DO relay to battery via the now enabled off-normal contact (VON) and the coil of the 4EO relay. Relay 4EO is a marginal relay and does not operate at this point due to the resistance of the 4DO relay coil.

The operation of relay 4DO opens the selector operate path of the 4EO relay via enabled transfer contact 4DO–1 and also removes the holding ground via enabled break contact 4DO–2. However, relays 4DO, 4BO and 4CO remain operated under control of the ground from the now-operated S relay in the seized trunk circuit.

It should be noted that the current flowing from the ground in trunk 9 through resistor 3RH1 of detector 12 to maintain relays 4DO, 4BO and 4CO operated is approximately 100 ma. Resistor 3RH1 is 2 ohms, thus, the voltage drop across that resistor is 0.2 volt which voltage is insufficient to turn on transistor 3HQ.

Communication may now take place between line circuit 24 and trunk 9 via the tip and ring leads (not shown) associated with the SL9 lead from trunk 10 which leads are accessed by separate ganged contacts (not shown) of switch SW1, level 1, in the manner discussed previously.

2.2 Connection to Last Trunk

Continuing now with FIGS. 3 and 4, let us now assume that trunk 10 is idle and all trunks, including trunk 9, connected to lower number terminals of switch SW2, level 1, are busy. Let us further assume that line circuit 25 has directed line finder 29 to stepping circuit 21 associated with switch SW2, level 1, to connect to a trunk associated with that subgroup.

Accordingly, wiper W2 of switch SW2, level 1, begins the stepping sequence and advances one terminal at a time in response to ground potential on each terminal. Since it is now assumed that trunk 9 is busy, and since trunk 9 has an appearance on terminal 9 of switch SW2, level 1, ground is on terminal 9. Thus, when wiper W2 contacts terminal 9 of switch SW2 ground via enabled make contact (S9–1) of trunk 9 is extended through resistor 3RH1 of detector 12 and over the SL9 lead and through wiper W2 of switch SW2, terminal 9, to operate stepping relay 4E1 in the manner discussed above for stepping relay 4EO. Thus, the selector advances to the next position.

It will be noted that the 400 ma. current necessary for the operation of the 4E1 stepping relay in position 9 was drawn through resistor 3RH1 of detector 12 thus establishing a momentary voltage potential across that resistor. Since the resistor is selected to be 2 ohms, the voltage established is 0.8 volt which causes transistor 3HQ to turn on thereby operating relay 3HP. Resistor 3RH4 and capacitor 3C form a simple timing network and these elements are switched across the winding of the 3HP relay via now enabled make contact 3HP–2. The value of the respective elements of the timing circuit are chosen such that the time constant, and thus the release time of relay 3HP is longer than the time for the selector to advance to the next position. Accordingly, even though wiper W2 advances to position 10, relay 3HP in detector 12 remains operated for a short period, typically 45 milliseconds, thereafter. The purpose of this delay will be more fully appreciated from that which is to follow.

when wiper W2 of switch SW2 advances to position 10, the stepping sequence stops since it has been assumed that trunk 10 associated with terminal 10 is idle. Accordingly, stepping circuit is not drawn through detector 13 at this point and thus the 3LS relay therein remains released. Communication or further dialing, may now take place between line circuits 25 and trunk 10 over the now-established connection. At this point both detectors 12 and 13 are normal with only holding current flowing through their respective current sensing circuits.

2.3 Registration of an Ineffectual Attempt to Obtain a Trunk

Continuing now in FIGS. 3 and 4, let us now assume that all trunks connected to the terminals of switch SW3, level 1, including trunks 9 and 10, are busy. Let us further assume that line circuit 26 is directed via line finder 30 to stepping circuit 22 associated with switch SW3, level 1, for connection to a trunk associated with that subgroup.

Accordingly, as discussed above for switches SW1 and SW2 wiper W3 of switch SW3 begins the stepping sequence and advances one terminal at any time in response to ground potential on each terminal. As wiper W3 contacts terminal 9 of switch SW3 heavy current is again drawn from the enabled (9S–1) contact of trunk 9 through detector 12, thus, causing the operation of relay 3HP in detector 12 in the manner set forth above while also causing the selector to advance in position 10.

Wiper W3, upon contact with terminal 10 of switch SW3, level 1, causes heavy current to flow from the enabled make contact (SIO–1) in trunk 10 through the 3RL1 resistor of detector 13 and over the SL10 lead and terminal 10 of wiper W3, switch SW3 to operate stepping relay 4E2. Accordingly, switch SW3 moves to the 11th rotary position.

During the interval in which wiper W3 is in contact with terminal 10, the current through the 3RL1 resistor of detector 13 establishes a voltage potential which turns on transistor 3LQ thereby operating relay 3LS. Since it will be recalled that relay 3HP, which relay operated when wiper W3 passed through position 9 of switch SW3, remains operated longer than the stepping time between positions, both the 3HP relay and the 3LS relay are operated concurrently.

As shown in FIG. 3, ground via the series combination of enabled make contacts 3HP–1 and 3LS–1 is extended to operate relay 3RR in register circuit 14. Relay 3RR, once enabled, locks operated to ground via enabled make contact 3RR–1 and a released break contact 3MR–1 of the message register. The operation of relay 3RR extends on output ground to a utilization circuit, such as message register MR1, via enabled make contact 3RR–2 to enable the coil 3MR of the message register MR1 thereby advancing the count by one. The enabling of the message register thereupon releases relay 3RR via now operated break contact 3MR–1.

Summarizing briefly at this time, upon an attempt by line circuit 26 to establish a connection to a trunk in the trunk subgroup served by switch SW3, level 1, each of the terminals of that level were contacted by wiper W3 driven from stepping circuit 22. Upon the drawing of current through terminal 9 followed by the drawing of current through terminal 10, detector 12 operated followed by the operation of detector 13 thereby providing an output pulse to advance the message register one count.

2.4 Return of Selector From 11th Position

At the end of the timing interval of the ninth position detector, which occurs during the period in which the wiper is in contact with terminal 10, relay 3HP releases. Relay 3LS in the 10th position detector releases immediately upon wiper W3 moving away from terminal 10 of switch SW3. Accordingly, when wiper W3 is in the 11th position the relays in detectors 12 and 13 are both normal. After arriving at the 11th position wiper W3 is released and returns one contact at a time toward the start position. Accordingly, when wiper W3 contacts position 10, detector 13 operates followed by the operation of detector 12 when wiper contacts terminal 9. However, since relay 3LS in detector 13 releases immediately upon the wiper leaving terminal 10, relay 3LS goes normal prior to the time when wiper W3 contacts terminal 9. Accordingly, an output pulse, and hence a register count, is inhibited by released make contact 3LS-1 as wiper W3 contacts each terminal in reverse order as it returns to the start position.

2.5 Isolation of Stages

In situations where trunks are accessed from more than one stage, provision must be made to insure that a selector in a lower order stage hunting for an idle path to a higher order stage does not cause the registration of a false count. As an example of the problem, with reference to FIG. 2, let us assume that trunk 17 is idle. We shall also assume that line circuit 24 is connected to trunk circuit 15 via switch SW1, level 1, terminal 8 and switch SW6, level 1, terminal 9, and that line circuit 25 is connected to trunk circuit 16 via switch SW2, level 1, terminal 9, and switch SW7, level 1, terminal 10. Also, let us assume for purposes of illustration that the isolator circuits 40, 41, and 42 are not present and that detectors 12 and 13 are connected in the manner set forth above for the single stage switching network. Thus, whenever both of the detectors operate concurrently register circuit 14 advances one count.

In the event that line circuit 26 directs stepping circuit 22, via line finder 30, to switch SW3, level 1, for a connection to an idle path to the second stage associated therewith, wiper W3 will begin to hunt for absence of ground potential on the terminals of level 1, switch SW3. As wiper W3 contacts terminal 8 of switch SW3, current is drawn through detector 12 from assumed busy trunk 15 and through terminal 9 of switch SW6. The relay in detector 12 operates at this point, as discussed previously. Ground potential on terminal 8 of switch SW3 causes the selector to step to terminal 9. As wiper W3 contacts terminal 9, current is drawn through detector 13 from assumed busy trunk 16 and through terminal 10 of switch SW7. Ground potential on terminal 9 of switch SW3 causes the selector to advance to terminal 10, still hunting for an idle path to the second switching stage. As wiper W3 contacts terminal 10, stepping circuit 45 begins wiper W8 of switch SW8 hunting for an idle trunk. Wiper W8 advances to terminal 8 and connects to assumed idle trunk 17.

Thus, although detectors 12 and 13 have been operated in proper sequence to cause a registration, the registration would be false since a trunk, trunk 17, is in fact idle and, as demonstrated, a connection has been established thereto. Accordingly, under these circumstances isolator circuits, such as isolator circuits 40, 41, 42, have been included to inhibit a registration at this point.

Figure 5:
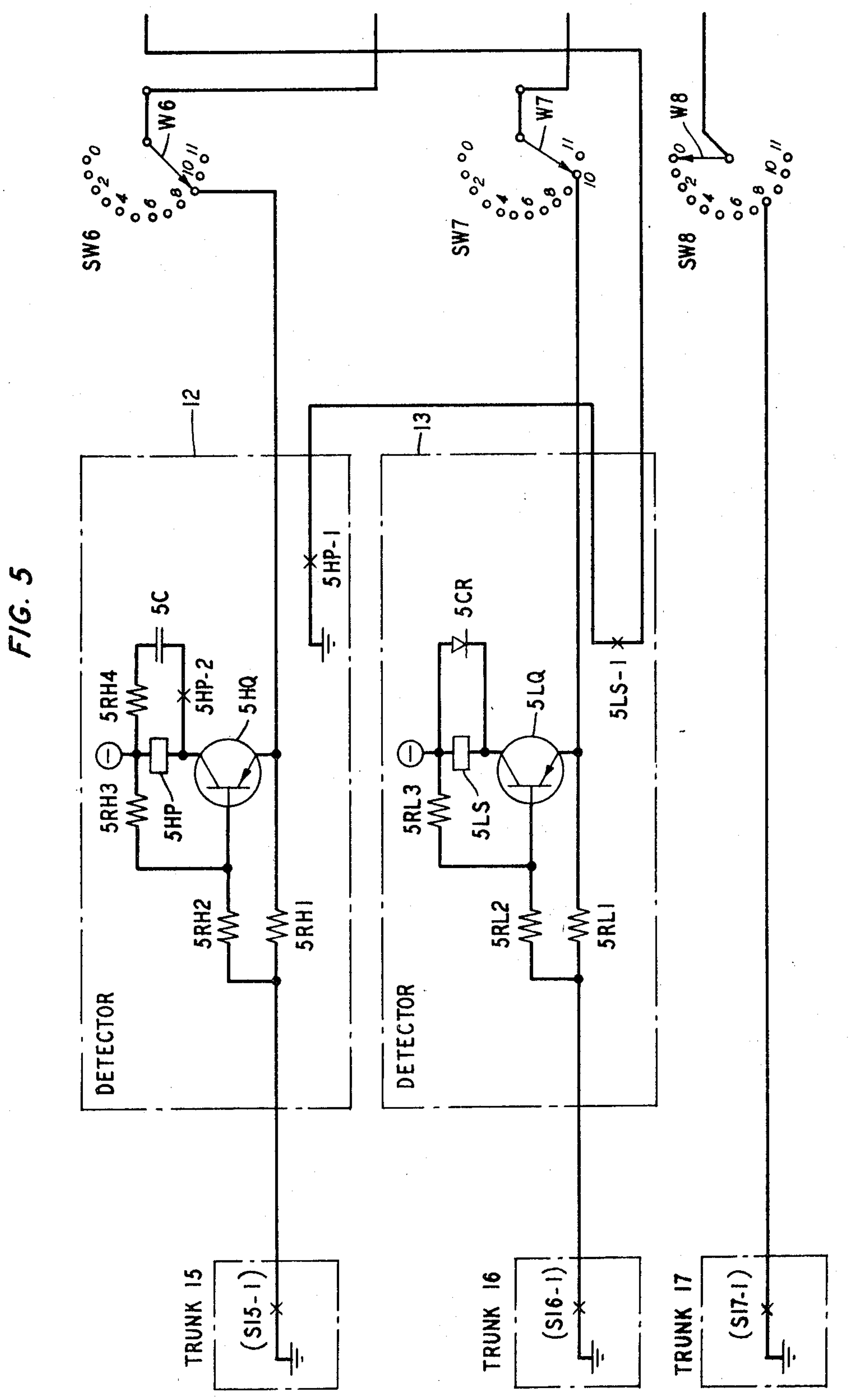
Figure 6:
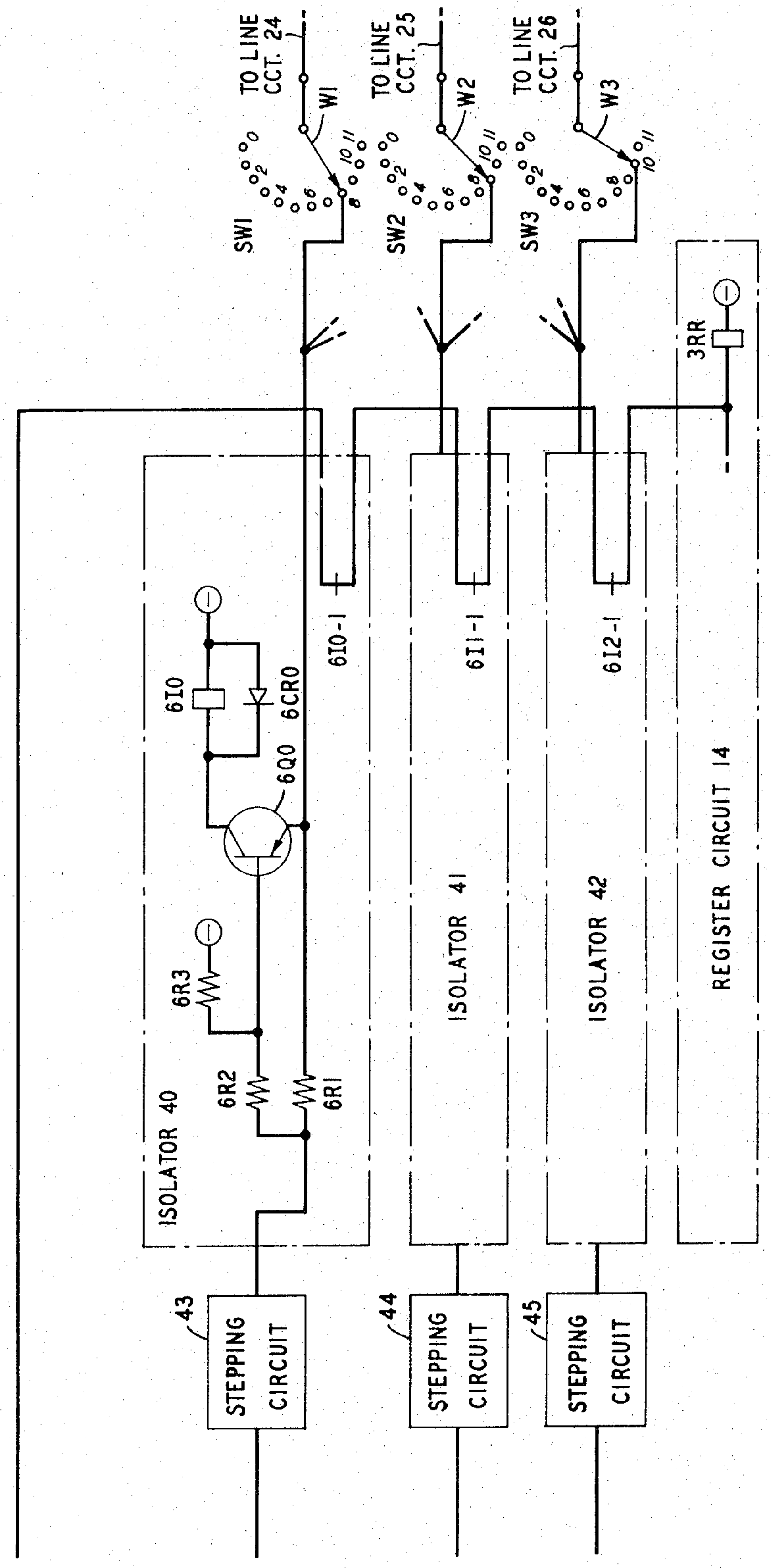

As shown in FIG. 2, and as detailed in FIGS. 5 and 6, isolator circuits 40, 41, and 42 are interposed between the switching stages to inhibit a false registration. As shown in FIG. 6, the isolator circuits, such as isolator circuit 40, contains an identical circuit to that contained in the detector circuits. Accordingly, when current passes through the isolator, the 6IO relay therein operates. Returning now to FIG. 2 and the example set forth above, when the detectors 12 and 13 operated from current drawn from the first switching stage, their respective isolators 40 and 41 also operated. Since, as shown in FIG. 6, the operate path for the register circuit 14 is serially connected through break contacts 6IO-1, 6I1-1 and 6I2-1 in the respective isolator circuits, the ground from the concurrently operated detector circuits 12 and 13 is broken thus preventing a registration at this point.

2.6 Registration in Multistage System

Turning again to FIG. 2, let us now assume that trunks 15 and 16 are busy in the same manner as before and that trunk 17 is busy via a second level selector not shown. Also, let us assume that line circuit 26 is directed to level 1 of switch SW3 via stepping circuit 22.

Accordingly, wiper W3 of selector switch SW3 contacts each terminal in succession drawing current from each as it hunts for a terminal with an absence of ground. Thus, as wiper W3 contacts terminals 8 and 9 of switch SW3, detectors 12 and 13 operate in sequence. However, as set forth above, since the detectors are now being operated from the first stage as opposed to the second stage, isolators 40 and 41 both operate thus preventing a registration at this point.

When wiper W3 advances to position 10, wiper W8 of switch SW8 begins to hunt, as discussed previously. As wiper W8 contacts terminal 9, detector 12 operates followed by the operation of detector 13 as wiper W8 contacts terminal 10. Since the detectors are turned on by current drawn from the second stage, as opposed to current drawn from the first stage, the isolator circuits remain normal. Thus, a registration is made of an ineffectual attempt to seize a trunk in a particular subgroup of trunks, without interference from selectors hunting in lower selector stages.

2.7 Conclusion

While the equipment of this invention has been shown in a particular embodiment wherein detectors have been placed in the trunk sleeve leads between the last stage selectors and the trunk it is understood that such an embodiment is intended only to be illustrative of the present invention and numerous other circuit arrangements may be devised by those skilled in the art without departing from the spirit and scope of the invention.

For example, the detectors may be inserted between any selector stage to provide statistical data on any link in the network. Also isolators may be used in as many stages as desired so as to obtain data from networks larger than those illustrated herein. In addition, numerous output devices may be used in conjunction with the invention, such as a device to provide an alarm, or a device to automatically reconfigure the switching network in situations where such reconfiguration is possible.

A further example would be where the detectors are connected to circuits other than the last two circuits in order to count the number of times the traffic through a given system reaches a certain density, or to count the number of times a special trunk is used or to provide an alarm prior to the time when the system actually becomes overloaded.

What is claimed is:

1. A traffic survey circuit for use in a communication system for determining the number of unsuccessful attempts which are made by selectors in a first selector group to establish connections to circuits associated with the terminals of said selectors comprising an output circuit, a first detector operable each time any of said selectors fails to establish a connection to a last circuit in said group of circuits, a second detector operable each time any of said selectors fails to establish a connection to a next to last circuit in said group of circuits, means for determining the sequence in which said first and said second detectors become operated, and means responsive to a certain operated sequence of said detectors for providing a signal to said output circuit.

2. The invention set forth in claim 1 wherein said selectors sequence over said terminals hunting for a terminal having an absence of potential thereon, and wherein said sequence-determining means includes an arrangement whereby an operated first detector returns to a released condition substantially immediately when said enabling selector sequences and an arrangement whereby an operated second detector is maintained operated for a certain time after said enabling selector sequences.

3. The invention set forth in claim 2 wherein each of said detectors comprises means connected between said associated circuit and said selectors for establishing a first voltage whenever a hunting selector stops thereon and for establishing a second voltage whenever a hunting selector sequence thereover, and means operable in response to the establishment of said second voltage for controlling said detector.

4. The invention set forth in claim 3 wherein said voltage-establishing means in each said detector comprises a resistor and said detector-controlling means comprises a relay driven by a transistor.

5. The invention set forth in claim 4 wherein said output circuit signal providing means includes make contacts of said relays in each of said detectors arranged in series.

6. The invention set forth in claim 2 further comprising means operable for sensing the operation of said detectors from selectors in groups other than said first selector group, and means controlled by said sensing means for inhibiting said output circuit signal when said detectors are enabled in said certain sequence from selectors in groups other than said first selector group.

7. The invention set forth in claim 6 wherein said sensing means comprises a plurality of isolation circuits each isolation circuit interposed between a selector in said first group and each of said selectors in said other selector group, said isolation circuits each comprising, means connected between said associated first group selector and said other group selectors for establishing a first voltage potential whenever a hunting selector in said other selector group stops thereon and for establishing a second voltage potential whenever a hunting selector in said other selector group sequencing thereover, and means operable in response to the establishment of said second voltage for controlling said isolation circuit.

8. The invention set forth in claim 7 wherein said voltage-establishing means in each said isolation circuit comprises a resistor and said isolation circuit controlling means comprises a relay driven by a transistor.

9. The invention set forth in claim 8 wherein said inhibiting means includes break contacts of said relays in each said isolation circuit arranged in series.

10. In a switching system of the selector type having circuits associated with terminals of a selector switch level and where a connection is made to any of the circuits by a hunting selector wiper switch stepping sequentially over the terminals until a terminal having an absence of potential thereon is found, the improvement comprising registration means, first detector means inserted between a last circuit and said terminals of a first selector switch stage associated with said last circuit, second detector means inserted between a next to last circuit and said terminals of said first selector switch stage associated with said next to last circuit, said first and second detector means each enabled upon a hunting selector switch wiper stepping over said associated terminals of said first selector switch stage, means for determining the sequence in which said first and said second detector means become enabled, and means responsive only to a certain determined sequence for enabling said registration means.

11. The invention set forth in claim 10 wherein said sequence determining means includes means for maintaining an enabled second detector enabled while said hunting selector steps to said last terminal.

12. The invention set forth in claim 11 wherein said first and said second detectors each comprise a relay having at least one make contact, means connected between said associated terminal and said associated circuit for establishing a certain voltage whenever said hunting selector steps past said associated circuit, and means including a transistor associated with said voltage-establishing means operable in response to the establishment of said certain voltage for enabling said relay.

13. The invention set forth in claim 12 wherein said registration enabling means includes said make contacts of said relays in each of said detectors arranged in series.

14. In a direct progression telephone communication switching system in which connections are established between calling lines and trunks by selectors sequentially interrogating the sleeve lead of each trunk and advancing from one trunk to the next trunk upon the drawing of current therefrom until a trunk sleeve lead is interrogated from which no current is drawn, a traffic survey arrangement for providing an output whenever a selector advances past a certain trunk without establishing a connection, comprising an output utilization circuit, a first detector interposed between the sleeve lead of said certain trunk and said selectors, a second detector interposed between the sleeve lead of a trunk next preceding said certain trunk and said selectors, each said detector arranged to operate only upon interrogation by a sequencing selector of a busy associated trunk, and means controlled by the operation of said second detector followed by the operation of said first detector for exclusively enabling said output utilization circuit.

15. The invention set forth in claim 14 wherein said first detector comprises circuitry for returning to a released condition substantially immediately when said interrogating selector sequences and said second detector comprises circuitry for maintaining operated said second detector for a certain time after said interrogating selector sequences.

16. The invention set forth in claim 15 wherein said first and said second detectors each comprise a relay having at least one make contact, a resistor connected into said sleeve lead for establishing a voltage whenever said sleeve lead is interrogated by a sequencing selector, said resistor having a resistance value low enough to avoid interference with said selector operation, and a transistor associated with said resistor for detecting a certain voltage level across said resistor and for enabling said relay in response to said detected certain voltage level.

17. The invention set forth in claim 14 further comprising means operable for sensing the operation of said detectors from other stage selectors interposed between said interrogating selectors and said calling lines, and means controlled by said sensing means for inhibiting said enabling of said output utilization circuit when said detectors are enabled from said other stage selectors.

18. The invention set forth in claim 17 wherein said sensing means comprises a plurality of isolation circuits each isolation circuit interposed into the connection between said other stage selectors and one of said interrogation selectors, said isolation circuits each comprising a relay having at least one break contact, a resistor connected into said interposed connection for establishing a voltage whenever said connection is interrogated by a sequencing selector in said other selector stage, and a transistor associated with said resistor for detecting a certain voltage level across said resistor and for enabling said relay in response to said detected certain voltage level, and wherein said break contacts of each of said relays are arranged in series thereby preventing the enabling of said output utilization circuit when any one of said isolation circuits becomes enabled.

19. The invention set forth in claim 15 wherein said circuitry for maintaining said second detector operated includes a timing circuit.

20. The invention set forth in claim 19 wherein said first and said second detectors each include a transistor, resistive elements for biasing said transistor and a resistor connected into said sleeve lead for establishing a voltage whenever said sleeve lead is interrogated by a sequencing selector, said resistor having a resistance value low enough to avoid interference with said selector operation, and wherein said second detector timing circuit includes a relay and a resistive-capacitive timing network connected across the winding of said relay.

* * * * *